US008830788B2

(12) United States Patent
Xia et al.

(10) Patent No.: US 8,830,788 B2
(45) Date of Patent: Sep. 9, 2014

(54) SENSITIVITY KERNAL-BASED MIGRATION VELOCITY ANALYSIS IN 3D ANISOTROPIC MEDIA

(75) Inventors: Fan Xia, Houston, TX (US); Yiqing Ren, Sugar Land, TX (US); Shengwen Jin, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 435 days.

(21) Appl. No.: 13/033,768

(22) Filed: Feb. 24, 2011

(65) Prior Publication Data

US 2012/0218861 A1    Aug. 30, 2012

(51) Int. Cl.
*G01V 1/00*     (2006.01)
*G01V 1/28*     (2006.01)
*G01V 11/00*    (2006.01)

(52) U.S. Cl.
CPC ............... *G01V 1/282* (2013.01); *G01V 11/00* (2013.01)
USPC .............................................. 367/50; 702/11

(58) Field of Classification Search
None
See application file for complete search history.

(56) References Cited

U.S. PATENT DOCUMENTS

| | | |
|---|---|---|
| 5,138,584 A | 8/1992 | Hale |
| 5,274,605 A | 12/1993 | Hill |
| 5,490,120 A | 2/1996 | Li et al. |
| 5,530,679 A | 6/1996 | Albertin |
| 5,544,126 A | 8/1996 | Berryhill |
| 5,784,334 A | 7/1998 | Sena et al. |
| 6,002,642 A | 12/1999 | Krebs |
| 6,021,094 A | 2/2000 | Ober et al. |
| 6,311,131 B1 | 10/2001 | Peardon et al. |
| 6,446,007 B1 | 9/2002 | Finn et al. |
| 6,611,761 B2 | 8/2003 | Sinha et al. |
| 7,065,004 B2 | 6/2006 | Jiao et al. |
| 7,196,969 B1 | 3/2007 | Karazincir et al. |
| 7,315,783 B2 | 1/2008 | Lou |
| 7,400,553 B1 | 7/2008 | Jin et al. |

(Continued)

FOREIGN PATENT DOCUMENTS

| | | |
|---|---|---|
| WO | WO-2010/082938 | 7/2010 |
| WO | WO-2011/053327 | 5/2011 |

OTHER PUBLICATIONS

Sava, Stanford Exploration Project, Report 115 May 22, 2014, pp. 199-213.*

(Continued)

*Primary Examiner* — Luke Ratcliffe
*Assistant Examiner* — Hovhannes Baghdasaryan
(74) *Attorney, Agent, or Firm* — Krueger Iselin LLP (57) ABSTRACT

Seismic imaging systems and methods that employ sensitivity kernel-based migration velocity analysis in 3D anisotropic media may demonstrate increased stability and accuracy. Survey data analysts employing the disclosed systems and methods are expected to provide better images of the subsurface and be better able to identify reservoirs and deposits for commercial exploitation. Certain embodiments migrate seismic survey data with an anisotropic velocity model to obtain common angle image gathers. These gathers are processed to obtain depth residuals along one or more horizons. Angle-domain sensitivity kernels are used to convert the depth residuals into velocity errors, which are then used to refine the velocity model. A user is then able to view a representation of the subsurface structure determined in part from the refined velocity model. Multiple iterations may be needed for the velocity model to converge. The velocity model may be a layered to have constant velocity values between formation boundaries.

20 Claims, 5 Drawing Sheets

(56) References Cited

U.S. PATENT DOCUMENTS

| | | | |
|---|---|---|---|
| 8,116,168 | B1 | 2/2012 | Luo et al. |
| 2002/0033832 | A1 | 3/2002 | Glatman |
| 2005/0207278 | A1* | 9/2005 | Reshef et al. ............... 367/38 |
| 2005/0270537 | A1 | 12/2005 | Mian et al. |
| 2008/0130411 | A1 | 6/2008 | Brandsberg-Dahl et al. |
| 2008/0137480 | A1 | 6/2008 | MacNeill |
| 2009/0213693 | A1 | 8/2009 | Du et al. |
| 2010/0114494 | A1* | 5/2010 | Higginbotham et al. ....... 702/16 |

OTHER PUBLICATIONS

PCT Internat'l Search Report and Written Opinion, dated Feb. 20, 2009, Appl No. PCT/US09/31400, "Data Acquisition and Prestack Migration Based on Seismic Visibility Analysis", filed Jan. 19, 2009, 9 pgs.

PCT Internat'l Search Report and Written Opinion, dated Jun. 8, 2009, Appl No. PCT/US09/040793, "Seismic Imaging Systems and Methods Employing a Fast Target-Oriented Illumination Calculation", filed Apr. 16, 2009, 9 pgs.

PCT Internat'l Search Report and Written Opinion, dated Dec. 18, 2009, Appl No. PCT/US09/62911, Seismic Imaging Systems and Methods Employing 3D Reverse Time Migration with Tilted Transverse Isotropy, filed Nov. 2, 2009, 9 pgs.

Baysal, Edip et al., "A Two-Way Nonreflecting Wave Equation", Geophysics, vol. 49, No. 2, (Feb. 1984), pp. 132-141, 11 Figs.

Baysal, Edip et al., "Reverse Time Migration", Geophysics, vol. 48, No. 11, (Nov. 1983 pp. 1514-1524, 9 Figs.

Bear, Glenn et al., "The Construction of Subsurface Illumination and Amplitude Maps via Ray Tracing", The Leading Edge, 19(7), (2000), pp. 726-728.

Cerjan, Charles "Short Note: A Nonreflecting Boundary Condition for Discrete Acoustic and Elastic Wave Equations", Geophysics, vol. 50, No. 1, (Apr. 1985), pp. 705-708.

Chang, W. F., et al., "3D Acoustic Prestack Reverse-Time Migration", Geophysical Prospecting 38, (1990), pp. 737-755.

Conry, Michael et al., "Mechanics of Composite Materials—Lecture 3", 4th Year Materials Engineering, (2004), pp. 1-8.

Dablain, M A., "The Application of High-order Differencing to the Scalar Wave Equation", Geophysics, vol. 51, No. 1, 13 Figs., 1 Table, (Jan. 1986), pp. 54-66.

Duveneck, Eric et al., "Acoustic VTI Wave Equations and Their Applications for Anisotropic Reverse-Time Migration", SEG Las Vegas 2008 Annual Meeting, (2008), pp. 2186-2190.

Etgen, John T., "Residual Prestack Migration and Interval-Velocity Estimation", Printed as Stanford Exploration Project No. 68, Copyright 1990, (Oct. 1990), pp. ii-xiii.

Fomel, Sergey "Migration and Velocity Analysis by Velocity Continuation", Stanford Exploration Project, Report Sergey,, (Nov. 9, 2000), pp. 6411-6670.

Hoffmann, Jorgen "Illumination, Resolution and Image Quality of PP- and PS-Waves for Survey Planning", The Leading Edge, 20(9), (2001), pp. 1008-1014.

Jin, Shengwen et al., "Depth Migration Using the Windowed Generalized Screen Propagators", 1998 SEG Expanded Abstracts, (1998), pp. 1-4.

Jin, Shengwen et al., "Illumination Amplitude Correction with Beamlet Migration", Acquisition/Processing, The Leading Edge, (Sep. 2006), pp. 1045-1050.

Jin, Shengwen et al., "One-Return Wave Equation Migration: Imaging of Duplex Waves", SEG/New Orleans 2006 Annual Meeting, New Orleans, LA, (Oct. 2006), pp. 2338-2342.

Jin, Shengwen et al., "U.S. Patent Application", "One-Return Wave Equation Migration Utility", U.S. Appl. No. 11/606,551, filed Nov. 30, 2006.

Komatitsch, Dimitri et al., "A Perfectly Matched Layer Absorbing Boundary Condition for the Second-Order Seismic Wave Equation", Geophys, J. Int., (2003), pp. 154, 146-153.

Kosloff, Dan D., et al., "Forward Modeling by Fourier Method", Geophysics, vol. 47, No. 10, (Oct. 1982), pp. 1402-1412.

Kuehl, Henning et al., "Generalized Least-Squares DSR Migration Using a Common Angle Imaging Condition", SEG Conference, San Antonio, Texas, (Fall 2001), 4 pgs.

Lesage, Anne-Cecile et al., "3D Reverse-Time Migration with Hybrid Finite Difference-Pseudospectral Method", SEG Las Vegas 2008 Annual Meeting, (2008), pp. 2257-2261.

Liu, Zhenyue "An Analytical Approach to Migration Velocity Analysis", Geophysics, vol. 62, No. 4, (Jul. 1998), pp. 1238-1249, 17 Figs, 1 Table.

Luo, M. et al., "Amplitude Recovery from Back Propagated Waves to True Scattered Waves", Technical Report No. 12, Modeling and Imaging Project, University of California, Santa Cruz, (2005), pp. 25-34.

Luo, Mingqui et al., "3D Beamlet Prestack Depth Migration Using the Local Cosine Basis Propagator", Modeling and Imaging Laboratory, IGPP, University of California, Santa Gruz, CA, (2003), pp. 1-4.

McMechan, G. A., "Migration by Extrapolation of Time-Dependent Boundary Values", Geophysical Prospecting 31, (1983), pp. 413-320.

Meng, Zhaobo et al., "3D Analytical Migration Velocity Analysis I: Two-step Velocity Estimation by Reflector-Normal Update", 69th Annual International Meeting SEG, Expanded Abstracts, 4 pgs.

Meng, Zhaobo et al., "3D Global Tomographic Velocity Model Building", SEG Int'l Exposition and 74th Annual Meeting, Denver, Colorado, (Oct. 10, 2004), pp. 1-4.

Mosher, Charles C., et al., "Migration Velocity Analysis Using Common Angle Image Gathers", 71st Annual International Meeting, SEG, Expanded Abstracts, pp. 889-892.

Muerdter, David et al., "Understanding Subsalt Illumination through Ray-Trace Modeling, Part 1: Simple 2 D Salt Models", The Leading Edge, 20(6), (2001), pp. 578-594.

Muerdter, David et al., "Understanding Subsalt Illumination through Ray-Trace Modeling, Part 2: Dippling Salt Bodies, Salt Peaks, and Non-reciprocity of Subsalt Amplitude Response", The Leading Edge, 20(7), (2001), pp. 687-688.

Muerdter, David et al., "Understanding Subsalt Illumination Through Ray-Trace Modeling, Part 3: Salt Ridges and Furrows, and Impact of Acquisition Orientation", The Leading Edge, 20(8), (2001), pp. 803-816.

Prucha, Marie L., et al., "Angle-Domain Common Image Gathers by Wave-Equation Migration", Stanford Exploration Project, Report 100 (Apr. 20, 1999), pp. 101-113.

Ristow, Dietrich et al., "Fourier Finite-Difference Migration", Geophysics, vol. 59, No. 12, (Dec. 1984), pp. 1882-1893.

Sava, Paul "Wave-Equation Migration Velocity Analysis—I: Therory", Stanford Exploration Project, (Jul. 22, 2004), pp. 1-37.

Sava, Paul C., et al., "Angle-Domain Common-Image Gathers by Wavefield Continuation Methods", Geophysics, vol. 68, No. 3, (May 2003), pp. 1065-1074, 14 Figs.

Schneider, William A., et al., "Efficient and Accurate Modeling of 3-D Seismic Illumination", SEG Expanded Abstracts 18, (Fall 1999), pp. 633-636.

Stoffa, P. L., et al., "Split-Step Fourier Migration", Geophysics, vol. 55, No. 4, (Apr. 1990), pp. 410-421, 11 Figs.

Stork, C. et al., "Linear Aspects of Tomographic Velocity Analysis", Geophysics, vol. 56, pp. 483-495.

Stork, C. et al., "Reflection Tomography in the Postmigrated Domain", Geophysics, vol. 57, No. 5, pp. 680-692.

Van Trier, Johannes A., "Tomographic Determination of Structural Velocities from Depth-Migrated Seismic Data", Printed as Stanford Exploration Project No. 66, (1990), pp. ii-xii.

Whitmore, N. D., "Iterative Depth Migration by Backward Time Propagation", Seismic 10-Migration, S10.1, (1983), pp. 382-385.

Wu, R. S., et al., "Mapping Directional Illumination and Acquisition-Aperture Efficacy by Beamlet Propagator", SEG Expanded Abstracts 21, (2002), p. 1352.

Xia, Fan et al., "Seismic Imaging Systems and Methods Employing Tomographic Migration-Velocity Analysis Using common Angle Image Gathers", U.S. Appl. No. 12/566,885, filed Sep. 25, 2009, 20 pgs.

Xia, Fan et al., "Tomographic Migration-Velocity Analysis Using Common Angle Image Gathers", SEG Annual Conference, Las Vegas, Nevada, (Nov. 9, 2008), pp. 3103-3107.

(56) References Cited

OTHER PUBLICATIONS

Xie, Xiao B., et al., "A Wave-Equation Migration Velocity Analysis Approach based on the Finite-Frequency Sensitivity Kernel", SEG Annual Meeting, Oct. 2008, 5 pgs.

Xie, Xiao B., et al., "Extracting an Angle Domain Information from Migrated Wavefield", SEG 72nd Annual Meeting, Expanded Abstracts 21, (Oct. 6, 2002), p. 1352.

Xie, Xiao B., et al., "The Finite-Frequency Sensitivity Kernel for Migration Residual Moveout and its Applications in Migration Velocity Analysis", Geophysics, vol. 73, No. 6, Nov.-Dec. 2008, pp. 241-249.

Xie, Xiao B., et al., "Three-Dimensional Illumination Analysis Using Wave Equation Based Propagator", SEG Expanded Abstracts 22, (2003), pp. 1360-1363.

Xie, Xiao-Bi et al., "Wave-Equation-Based Seismic Illumination Analysis", Geophysics, vol. 71, No. 5, (Sep. 20, 2006), pp. S169-S177, and 10 Figs.

Xu, Shiyong et al., "An Orthogonal One-Return Wave Equation Migration", SEG San Antonio 2007 Annual Meeting, San Antonio, TX, (2007), 5 pgs.

Xu, Shiyong et al., "Can We Image Beneath Salt Body—Target-Oriented Visibility Analysis", SEG Houston 2005 Annual Meeting, SPMI 6.8, Houston, TX. (2005), 5 pgs.

Xu, Shiyong et al., "Wave Equation Migration of Turning Waves", SEG New Orleans 2006 Annual Meeting, (2006), 5 pgs.

Yoon, Kwangjin et al., "Challenges in Reverse-Time Migration", SEC Int'l. Exposition and 74th Annual Meeting, Denver, Colorado, (Oct. 10, 2004), 4 pgs.

Youn*, Oong K., et al., "Depth Imaging with Multiples", Geophysics, vol. 66, No. 1, (Jan./Feb. 2001), pp. 246-255.

Zhou, Hongbo et al., "Tomographic Residual Curvature Analysis: The Process and its Components", 73rd Annual International Meeting, SEG, 4 pgs.

Jin, Yaochu et al., "A Framework for Evolutionary Optimization with Approximate Fitness Functions", IEEE Transactions on Evolutionary Computation, vol. 6, No. 5, pp. 481-494 (Oct. 2002).

Jin, Yaochu et al., "Neural Network Regularization and Ensembling Using Multi-Objective Evolutionary Algorithms", Congress on Evolutionary Computation, Portland, Oregon, (2004),8 pgs.

PCT International Search Report and Written Opinion, dated May 1, 2012, Appl No. PCT/US2012/026243, "Sensitivity Kernel-Based Migration Velocity Analysis in 3D Anisotropic Media", filed Feb. 24, 2011, 7 pgs.

He, Yaofeng et al., "Angle-domain sensitivity kernels for migration velocity analysis: Comparison between theoretically derived and directly measured", SEG Expanded Abstracts 28, 2009, 6 pgs., Citation retrieved from the internet with citation at <URL:http://library.seg.org/getabs/servlet/GetabsServlet?prog=normal&id=SEGEAB000028000001002909000001&idtype=cvips&gifs=yes&ref=no> Retrieved from the Internet.

He, Yaofeng et al., "Velocity analysis using shot-indexed sensitivity kernels: application to a complex geological model", SEG Denver Annual Meeting, 2010, 6 pgs., citation retrieved from the internet with citation at <URL:http://www.es.ucsc.edu/~acti/New_WTOPI_Web/PUBLICATIONS_papers/seg/seg2010/HeXie_2010_velocity_analysis.pdf? Page 1, Introduction section, second para, Shot Index Sensitivity Kernel section, first para.

PCT International Preliminary Report on Patentability, dated May 18, 2012, Appl No. PCT/US2009/062911, "Seismic Imaging Systems and Methods Employing 3D Reverse Time Migration with Tilted Transverse Isotropy", filed Nov. 2, 2009, 5 pgs.

* cited by examiner

SENSITIVITY KERNAL-BASED MIGRATION VELOCITY ANALYSIS IN 3D ANISOTROPIC MEDIA

BACKGROUND

Seismology is used for exploration, archaeological studies, and engineering projects that require geological information. Exploration seismology provides data that, when used in conjunction with other available geophysical, borehole, and geological data, provides information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially-generated seismic waves to map subsurface structures. The seismic waves propagate from a source down into the earth and reflect from boundaries between subsurface structures. Surface receivers detect and record reflected seismic waves for later analysis. Though some large-scale structures can often be perceived from a direct examination of the recorded signals, the recorded signals must be processed to remove distortion and reveal finer detail in the subsurface image. Because this processing includes migration (a conversion of the measured time-dependent waveforms into position-dependent seismic information), the quality of the resulting subsurface image is highly dependent on the accuracy of the estimated seismic wave propagation speeds. A subsurface velocity model is used during the migration step to specify how this propagation speed varies as a function of position.

"Velocity analysis" is the term used to describe the act of extracting velocity information from seismic data. One way to perform velocity analysis is to begin with an assumed velocity model, to migrate the seismic data based on this model, and to analyze the residual curvature ("residual moveout") of the migrated seismic data to determine errors in the assumed velocity model. The velocity model can then be updated and the process repeated until the model converges. This approach to velocity analysis is called "migration velocity analysis" or "MVA".

The residual curvature at a given position is a function not only of the local velocity error at that position, but also of the velocity errors all along the path traversed by the seismic waves. To separate out the individual contributions to the residual curvatures, the subsurface structure can be analyzed from a tomographic perspective. See, e.g.:

Stork, C., and R. W. Clayton, 1991, Linear aspects of tomographic velocity analysis: Geophysics, 56, 483-495.

Stork, C., 1992, Reflection tomography in the postmigrated domain: Geophysics, 57, 680-692.

Liu, Z., 1997, An analytical approach to migration velocity analysis: Geophysics, 62, 1238-1249.

Meng, Z., N. Bleistein, and K. D. Wyatt, 1999, 3D analytical migration velocity analysis I: Two-step velocity estimation by reflector-normal update: 69th Annual International Meeting, SEG, Expanded Abstracts, 1727-1730.

Meng, Z., P. A. Valasek, S. A. Whitney, C. B. Sigler, B. K. Macy, and N. Dan Whitmore, 2004, 3D global tomographic velocity model building: 74th Annual International Meeting, SEG, Expanded Abstracts, 2379-2382.

Mosher, C. C., S. Jin, and D. J. Foster, 2001, Migration velocity analysis using common angle image gathers: 71st Annual International Meeting, SEG, Expanded Abstracts, 889-892.

Zhou, H., S. H. Gray, J. Young, D. Pham, and Y. Zhang, 2003, Tomographic residual curvature analysis: The process and its components: 73rd Annual International Meeting, SEG, Expanded Abstracts, 666-669.

For the most part, existing MVA techniques rely on ray-based tomography to convert the residual curvature into updates for the velocity model. The assumptions inherent in ray-based tomography cause excessive smoothing in the velocity updates, thereby limiting resolution of the resulting velocity model. To address this issue, a recent paper (Xie, X., and H. Yang, 2008, The finite-frequency sensitivity kernel for migration residual moveout: Geophysics, 73, S241-249) proposes the use of a sensitivity kernel to determine velocity model updates from relative residual moveout values. However, the velocity models produced by the method described in the paper also have limited resolution and in many cases they fail to match accepted geophysical principles.

BRIEF DESCRIPTION OF THE DRAWINGS

A better understanding of the various disclosed embodiments can be obtained when the following detailed description is considered in conjunction with the attached drawings, in which.

While the disclosed embodiments susceptible to various modifications and alternative forms, specific implementations are shown by way of example in the drawings and will be described herein in detail. It should be understood, however, that the drawings and detailed description are not intended to limit the disclosed embodiments to the particular form shown, but on the contrary, the intention is to cover all modifications, equivalents and alternatives falling within the scope of the appended claims.

DETAILED DESCRIPTION

The issues identified in the background above are at least in part addressed by seismic imaging systems and methods that employ sensitivity kernel-based migration velocity analysis in 3D anisotropic media. Relative to existing methods, the disclosed systems and methods demonstrate increased stability and accuracy. Survey data analysts employing the disclosed systems and methods are expected to provide better images of the subsurface and be better able to identify reservoirs and deposits for commercial exploitation. Certain method embodiments migrate seismic survey data with an anisotropic velocity model to obtain common angle image gathers. These gathers are processed to obtain depth residuals along one or more horizons. Angle-domain sensitivity kernels are used to convert the depth residuals into velocity errors, which are then used to refine the velocity model. A user is then able to view a representation of the subsurface structure determined in part from the refined velocity model. Multiple iterations may be needed for the velocity model to converge. In some instances the velocity model is constrained or converted to a layered model having constant velocity values between formation boundaries.

Figures 1, 2:
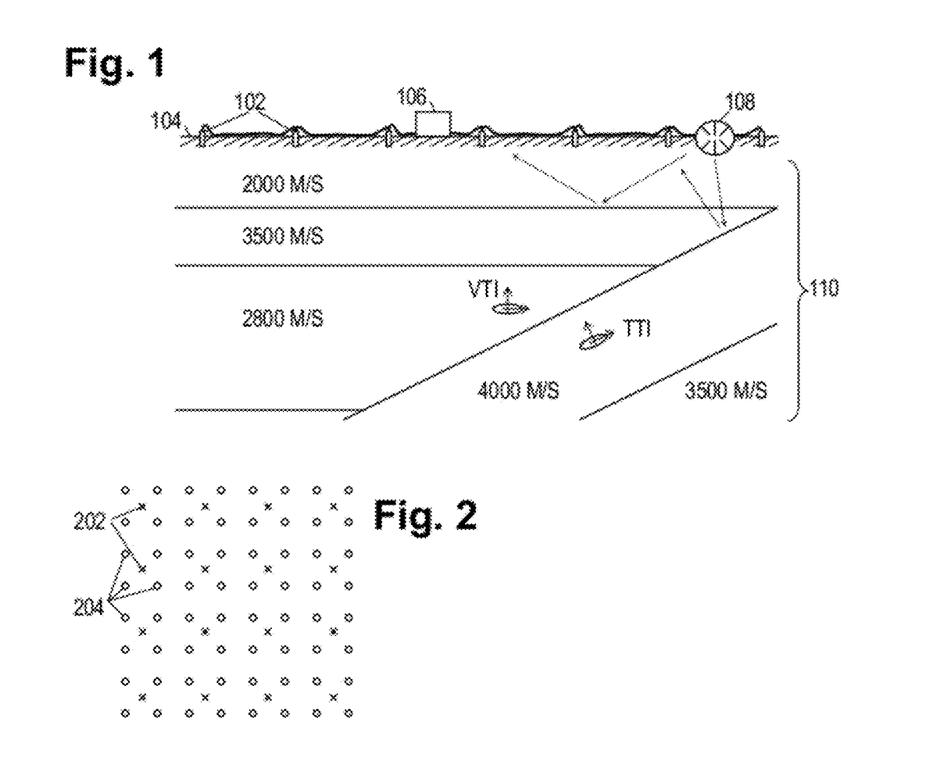
FIG. 1 shows an illustrative seismic survey environment.
FIG. 2 shows an illustrative seismic source and receiver geometry.

The disclosed systems and methods are best understood when described in an illustrative usage context. Accordingly, FIG. 1 shows an illustrative seismic survey environment, in which surveyors position an array of seismic receivers 102 in a spaced-apart arrangement on the earth's surface 104 to detect seismic waves. (The array typically extends for a couple of kilometers in each direction, and may be moved after each series of shots until the whole survey region has been covered.) The receivers 102 communicate wirelessly or via cable to a data acquisition unit 106 that receives, processes, and stores the seismic signal data collected by the receivers. The surveyors trigger a seismic energy source 108 (e.g., a vibrator truck) at multiple positions ("shot locations") to generate seismic energy waves that propagate through the earth 110. Such waves reflect from acoustic impedance discontinuities to reach the receivers 102. Illustrative discontinuities include faults, boundaries between formation beds, and boundaries between formation fluids. The discontinuities appear as bright spots in the subsurface structure representation that is derived from the seismic signal data.

FIG. 1 further shows an illustrative subsurface structure. In this figure, the earth has three relatively flat formation layers and two dipping formation layers of varying composition and hence varying speeds of sound. Within each formation, the speed of sound can be isotropic (i.e., the same in every direction) or anisotropic. Due to the manner in which rocks are formed, nearly all anisotropic formations are transversely isotropic. In other words the speed of sound in anisotropic formations is the same in every "horizontal" direction, but is different for sound traveling in the "vertical" direction. Note, however, that geological activity can change formation orientations, turning a vertical transversely isotropic ("VTI") formation into a tilted transversely isotropic ("TTI") formation. In FIG. 1 shows the third flat layer as being VTI, while the first dipping formation layer is TTI.

FIG. 2 shows an illustrative geometry for source positions 202 and receiver positions 204, as they might be seen from an overhead view. Viable seismic survey geometries are infinite in variety, and can be gathered on a sector-by-sector basis, a rolling geometry basis, a moving-array basis, and various combinations thereof. The main message here is that the number of receiver signals acquired in response to each firing of the seismic source is fairly large, and when the number of source firings is taken into account, the resulting number of traces can easily reach into the millions.

Figure 3:
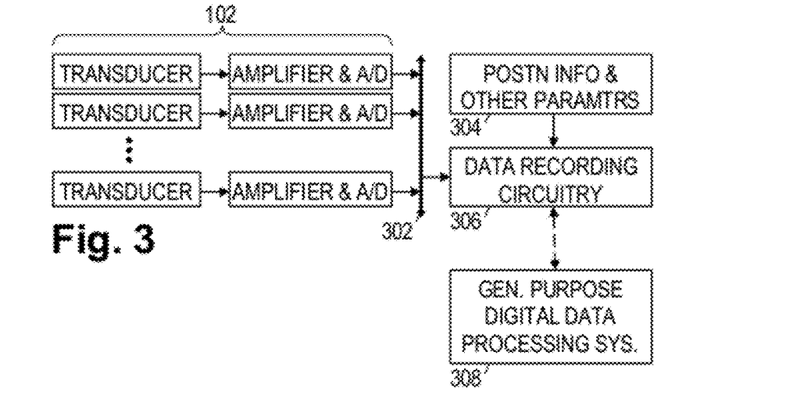
FIG. 3 shows an illustrative seismic survey recording system.

FIG. 3 shows an illustrative seismic survey recording system having the receivers 102 coupled to a bus 302 to communicate digital signals to data recording circuitry 306. Position information sensors 304 (and optionally sensors for other parameters) are also coupled to the data recording circuitry 306 to enable the data recording circuitry to store additional information useful for interpreting the recorded data. Illustratively, such additional information can include the precise locations of the receivers and source firings, source waveform characteristics, digitization settings, detected faults in the system, etc.

Figure 4:
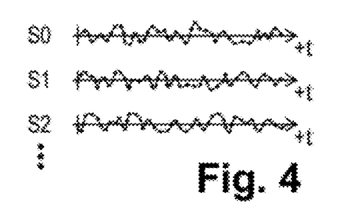
FIG. 4 shows illustrative seismic traces.

The seismic sensors 102 may each include multi-axis accelerometers and/or geophones and, in some environments, hydrophones, each of which may take high-resolution samples (e.g., 16 to 32 bits) at a programmable sampling rate (e.g., 400 Hz to 1 kHz). Recording circuitry 306 acquires the data streams from receivers 102 onto a nonvolatile storage medium such as a storage array of optical or magnetic disks. The data is stored in the form of (possibly compressed) seismic traces, each trace being the signal detected and sampled by a given receiver in response to a given shot. (The associated shot and receiver positions are also stored.) Illustrative seismic signals are shown in FIG. 4. The signals indicate some measure of seismic wave energy as a function of time (e.g., displacement, velocity, acceleration, pressure).

The signal data can be partitioned in different ways to make processing and analysis more feasible. When partitioned based on a given parameter, each data partition is called a "gather". For example, a "shot gather" is the group of traces recorded for a single firing of the seismic source. A "common midpoint gather" is the group of traces that have a midpoint within a defined region. "Image gathers" are partitions of the migrated ("image") data based on the given parameter. Thus "common offset image gathers" constitute partitions of the image data according to the distance between source and receiver, while "common angle image gathers" are partitioned according to the incidence (or reflection) angle of seismic energy at the image point. At one or more points in the image formation process, the gathers may be added together ("stacked") to obtain a combined data set, e.g., a final image of the subsurface structure.

A general purpose data processing system 308 receives the acquired seismic survey data from the data recording circuitry 306. In some cases the general purpose data processing system 308 is physically coupled to the data recording circuitry and provides a way to configure the recording circuitry and perform preliminary processing in the field. More typically, however, the general purpose data processing system is located at a central computing facility with adequate computing resources for intensive processing. The survey data can be transported to the central facility on physical media or communicated via a computer network. Processing system 308 includes a user interface having a graphical display and a keyboard or other method of accepting user input, enabling users to view and analyze the subsurface structure images derived from the seismic survey data.

Figure 5:
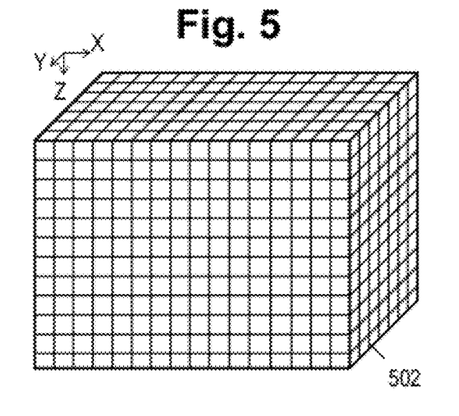
FIG. 5 shows an illustrative data volume in three dimensions.

The recorded seismic survey data is of little use when maintained in the format of FIG. 4. Although it is possible to plot the various recorded waveforms side by side in a plot that reveals large scale subsurface structures, such structures are distorted and finer structures cannot even be seen. Accordingly, the data is processed to create a data volume, i.e., a three dimensional array of data values such as that shown in FIG. 5. The data volume 502 represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format readily lends itself to computational analysis and visual rendering, and for this reason, the data volume 502 may be termed a "three-dimensional image" of the survey region.

Figure 6:
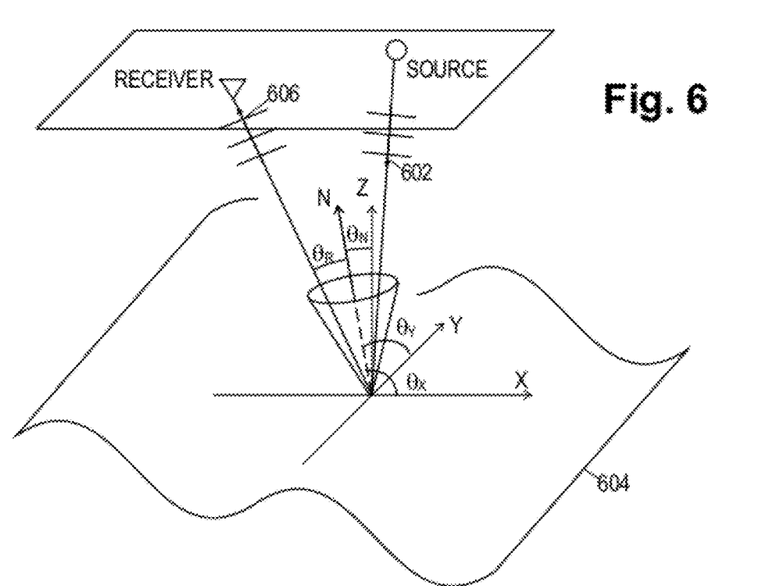
FIG. 6 shows an illustrative shot geometry.

To explain how the seismic data is often partitioned and processed, it is helpful to define a notation for certain parameters. FIG. 6 shows some of the parameters relating to the geometry of an illustrative shot. Seismic energy propagates along ray 602 from a seismic source at location $r_S$ to a point $r_T$ on a target interface 604, from which it partially reflects upward along ray 606 towards a receiver at location $r_R$. At the reflection point $r_T$, the interface 604 has a normal vector n. In a predefined coordinate system having the x- and y-axes in a horizontal plane and an upward-pointing z-axis, the normal vector n forms an angle with each axis. The angle between the normal vector n and the x-axis is $\theta_X$, the angle between the normal vector n and the y-axis is $\theta_Y$, and the angle between the z-axis and the normal vector n is $\theta_n$. The incoming ray 602 and reflected ray 606 are at equal (but opposite) "opening" angles $\theta_r$ relative to the normal vector. Relative to the z-axis, the incoming ray 602 forms incident angle $\theta_s$ and the reflected ray forms a reflection (aka scattering) angle $\theta_g$. The incident and scattering angle pair ($\theta_s$, $\theta_g$) can be converted to a normal and opening angle pair ($\theta_n$, $\theta_r$) according to the relationships:

$$\bar{\theta}_n = (\bar{\theta}_s + \bar{\theta}_g)/2, \bar{\theta}_r = (\bar{\theta}_s - \bar{\theta}_g)/2. \tag{1}$$

Figure 7:
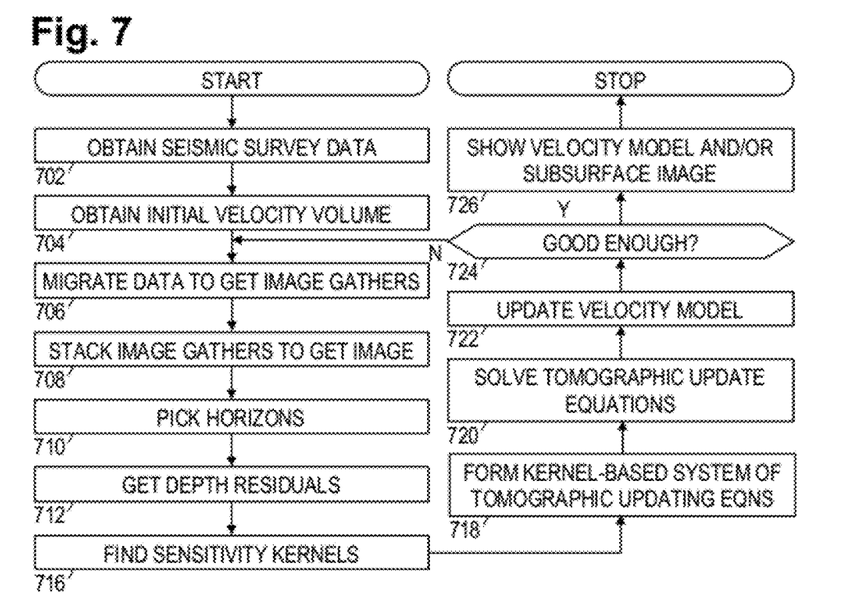
FIG. 7 shows a flowchart of an illustrative seismic imaging method.

With this understanding of the shot geometry, we now turn the illustrative seismic data processing method of FIG. 7, which begins in block 702 with the obtaining of seismic survey data. The survey data is typically in a trace format, e.g., pressure field data as a function of shot location, receiver location, and time $P(r_S, r_R, t)$. Traditionally a change of variable is performed to place this data in the midpoint-offset-time domain, i.e., $P(m, h, t)$, where midpoint $m = (r_S + r_R)/2$ and offset $h = |r_S - r_R|/2$. Observing that this data represents the pressure field observed at the surface (z=0), the wavefield equation is employed to extrapolate the subsurface wavefield, a process known as migrating the data. The fundamentals for this process are described in Chapter 1 of Jon F. Claerbout, *Imaging the Earth's Interior*, Blackwell Scientific Publications, Oxford, 1985.

Figure 8A:
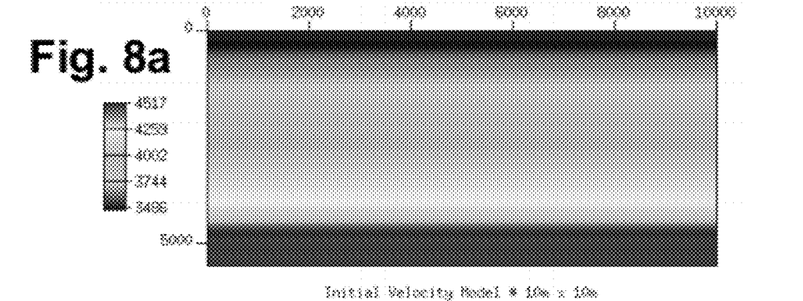
FIGS. 8a-8d show illustrative velocity models.

Among other things, migration requires a velocity model v(r), which specifies a wave propagation speed for every point r in the subsurface volume V. Accordingly, an initial velocity model is postulated in block 704. An initial velocity model can be postulated based on any one of a number of approaches including: a constant velocity, a velocity that increases linearly with depth, a velocity derived from theoretical models of rock compaction, and measured values from sonic logs of an exploratory borehole. FIG. 8a shows an illustrative velocity model having a velocity that increases linearly with depth starting at 3500 m/s. This model will be used as the initial velocity model in the example that follows.

In block 706 (FIG. 7), the velocity model is used to migrate the survey data. Any one of the existing wave-equation based migration techniques can be employed to obtain the subsurface data volume. One such migration technique is described in Marie L. Prucha, Biondo L Biondi, and William W. Symes, "Angle-domain common image gathers by wave-equation migration", Stanford Exploration Project, Report 100, Apr. 20, 1999, pp. 101-113, and can be summarized as follows:

$$P(m, h, t; z=0) \xrightarrow{FT} P(m, h, \omega; z=0) \tag{2}$$

$$P(m, h, \omega; z=0) \xrightarrow{DSR} P(m, h, \omega; z) \tag{3}$$

$$P(m, h, \omega; z) \xrightarrow{Slant\ Stack} P(m, p_h, \tau; z) \tag{4}$$

$$P(m, p_h, \tau, z) \xrightarrow{Imaging} P(m, p_h, \tau=0; z) \tag{5}$$

Equation (2) represents a Fourier transform of the data set to convert the data acquired at the surface (z=0) into the midpoint-offset-frequency domain. Equation (3) represents the migration of the data set using the well-known double square root (DSR) equation for extrapolating a wavefield. (See, e.g., Biondi and Palacharla, 1996, 3-D prestack migration of common-azimuth data: Geophysics, 61, 1822-1832).

Equation (4) represents a Radon transform, which is also termed a "slant stack" operation, of the data into the midpoint-$p_h$-tau domain (see e.g., U.S. Pat. No. 4,779,238). Offset ray parameters $p_h$ and tau represent slope and intercept of slant lines used to stack the data.

As indicated by equation (5), setting tau equal to zero provides a set of angle-domain common-image gathers, which can be viewed as a set of images $P(m, p_h, z)$, each image being derived from seismic energy impacting the reflector at a different angle. The offset ray parameter $p_h$ is related to the local dip $\theta_n$ and opening angle $\theta_r$ by the equation:

$$p_h = 2S(m, z) \cos\theta_n \sin\theta_r, \tag{6}$$

where $S(m, z)$ is the slowness (the inverse of acoustic velocity $V(m, z)$) in the neighborhood of the reflector. (Because velocity and slowness have a one-to-one relationship, these terms are sometimes used interchangeably.)

As previously mentioned, other migration techniques can be employed. Such alternative techniques may result in different image gathers, e.g., shot index gathers as described in Xie, X., and H. Yang, 2008, The finite-frequency sensitivity kernel for migration residual moveout: Geophysics, 73, S241-249.

Figure 9A:
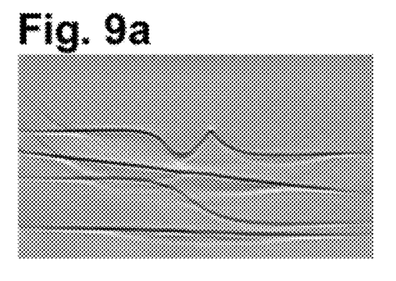
FIGS. 9a-9g show illustrative data volumes produced at different stages of one example.
Figure 9B:
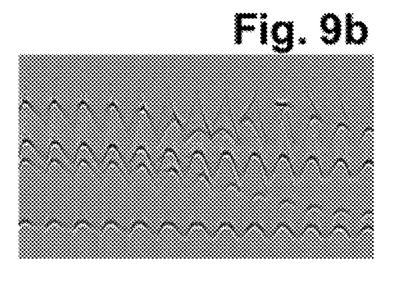

In block 708, the gathers are stacked to obtain a combined image of the structure in the subsurface volume. Note that the individual gathers are not yet discarded, but are stored for later use in block 712. FIGS. 9a and 9b show an example of a combined image obtained from shot index gathers migrated based on the initial velocity model of FIG. 8a. FIG. 9a shows pixels as a function of a vertical axis (depth) and horizontal axis (inline- or x-axis). The pixel brightness represents the field intensity at the corresponding point. FIG. 9b shows pixels as a function of a vertical axis (depth) and horizontal axis (shot index), with the pixel brightness representing field intensity as a function of depth and shot index.

Figure 9C:
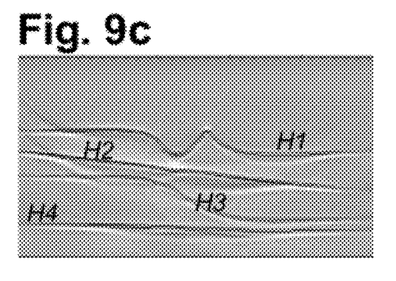

Even though the velocity model is in error, one can nevertheless perceive significant structure in the stacked image data. The velocity model error is made most evident by the residual curvature present in FIG. 9b, though smearing and ghosting of the structures in FIG. 9a also suggests that the velocity model is inaccurate. Nevertheless, the structure is clear enough to permit horizon picking as indicated in FIG. 9c. This operation is represented in FIG. 7 as block 710. Horizon picking can be performed manually, or it can be performed automatically with the use of standard image processing algorithms. These horizons will be used as constraints to improve the accuracy of subsequent processing operations.

In block 712, the depth residuals are determined at each grid point on the picked horizons. To determine the depth residual, the system begins by scanning through a range of velocity error values. The error values are expressed as $\rho$, a ratio of the model velocity to the actual velocity, where the values are measured by averaging the velocities from the surface to the selected point on the horizon. The range over which $\rho$ is tested will vary, but in some implementations will be 0.5 to 1.5. For each value of $\rho$, the corresponding depth shift for each image gather is determined. For shot-indexed image gathers, the depth shift is $$\Delta z = z_0 \frac{1-\rho}{\rho} \left[ \frac{1}{\cos^2\theta_n} - \frac{1}{2\cos\theta_r \cos\theta_n} \left( \frac{1}{\cos\theta_s} + \frac{1}{\cos\theta_g} \right) \right] \tag{7}$$

where $z_0$ is the depth of the selected point, $\theta_n$ is the structural dip angle, $\theta_r$ is the opening angle, $\theta_s$ is the incident angle and $\theta_g$ is the scattering angle. For slowness angle image gathers, the depth shift is $$\Delta z = z_0 \left[ \sqrt{\frac{1 - \frac{v^2 p_h^2}{4(\rho^2 - \sin^2 \theta_n)}}{1 - \frac{v^2 p_h^2}{4\cos^2 \theta_n}}} - 1 \right] \quad (8)$$

where $v$ is the local velocity from the velocity model.

Figure 9D:
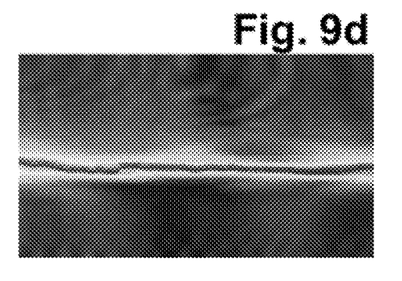
Figure 9E:
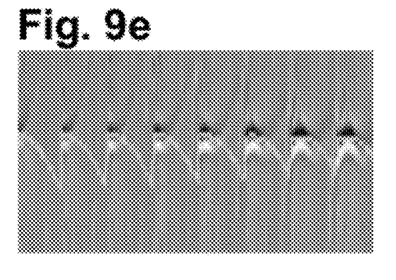

For each value of $\rho$, the system applies the appropriate depth shift to the image gathers and calculates their semblance in the neighborhood of the selected point. FIG. 9d shows illustrative semblance values as a function of a vertical axis ($\rho$) and a horizontal axis (inline- or x-axis position on the current horizon). The value of $\rho$ that maximizes the semblance at each given position is identified and used in equation (7) or (8) to determine the corresponding depth residual for that horizon grid point in each image gather. These depth residuals are hereafter referenced as $\Delta z(r_I, \chi)$, where $\chi$ indicates an image gather (e.g., an index value for a shot-index image gather, or an offset ray parameter value for a common angle image gather) and $r_I$ is an image point in that gather. In FIG. 9d, the position of the semblance maximum varies with position, but for the most part is just above the horizontal centerline of the figure, indicating that $\rho$ is generally slightly greater than one. FIG. 9e shows the resulting depth residuals that will be employed in a later step.

In block 716, sensitivity kernels are determined. These kernels will be the basis of the conversion of relative residual moveouts into velocity model updates. The system of equations to be solved is:

$$\sum_i \int_{V(r_i)} m(r') K^B(r', r_I, \chi_1, \chi_2) dr' = \Delta z(r_I, \chi_2) - \Delta z(r_I, \chi_1) \quad (9)$$

where the summation is over a grid of points $r_i$ in the image volume, the integral is over a rectangular cell corresponding to the grid point $r_i$, $m(r_i)$ is the normalized local velocity perturbation $\delta v(r)/v(r)$ (which is the unknown variable in this equation), $\chi_1$ and $\chi_2$ represent different image gathers, and $K^B(r_i, r_I, \chi_1, \chi_2)$ is a combination of the broadband sensitivity kernels for the different image gathers. For the shot-indexed image gathers, the combined broadband sensitivity kernel is:

$$K^B(r_i, r_I, r_{S_1}, r_{S_2}) = \frac{v(r_I)[K_D^B(r_i, r_I, r_{S_2}) + K_U^B(r_i, r_I, r_{S_2})]}{2\cos[\theta_r(r_I, r_{S_2})]} - \frac{v(r_I)[K_D^B(r_i, r_I, r_{S_1}) + K_U^B(r_i, r_I, r_{S_1})]}{2\cos[\theta_r(r_I, r_{S_1})]} \quad (10)$$

where $\theta_r(r_I, r_S)$ is the opening angle, and the broadband kernel components are $$K_D^B(r, r_I, r_S) = \int \frac{W(\omega)}{\omega} \text{Im}\left[ 2k_0^2 \frac{G_D(r; r_S, \omega) G(r; r_I, \omega)}{G_D(r_I; r_S, \omega)} \right] d\omega \quad (11a)$$

$$K_U^B(r, r_I, r_S) = \int \frac{W(\omega)}{\omega} \text{Im}\left[ 2k_0^2 \frac{G_U^*(r; r_S, \omega) G(r; r_I, \omega)}{G_U^*(r_I; r_S, \omega)} \right] d\omega \quad (11b)$$

where $k_0 = \omega/v(r)$, $G(r; r_I, \omega)$ is the Green's function from the scatter point $r$ to the image point $r_I$, $G_D$ and $G_U$ are Green's functions for down- and up-going waves, respectively, and the weighting function $W(\omega)$ is based on the power spectrum $P(\omega)$ of a source (or other reference) signal:

$$W(\omega) = \frac{\omega^2 P(\omega)}{\int \omega^2 P(\omega) d\omega} \quad (12)$$

Xie, X. and H. Yang, 2008, "A wave-equation velocity analysis approach based on the finite-frequency sensitivity kernel", 78th SEG Expanded Abstracts, discloses an interpolation method that reduces storage requirements for the broadband kernels of equation (9). With this method, the grid of image points can be partitioned into a relatively small number of cells whose size depends on the required accuracy. As outlined by Xie and Yang, each of the integrals in equation (9) becomes (for 2D cells) the matrix equation:

$$\int_{V(r_i)} m(r') K^B(r', r_I, \chi_1, \chi_2) dr' = \quad (13)$$

$$[m(r_1) \ m(r_2) \ m(r_3) \ m(r_4)] \begin{bmatrix} 1 & -1 & -1 & 1 \\ 0 & 1 & 0 & -1 \\ 0 & 0 & 1 & -1 \\ 0 & 0 & 0 & 1 \end{bmatrix} \begin{bmatrix} FK_1 \\ FK_2 \\ FK_3 \\ FK_4 \end{bmatrix}$$

where $r_1$, $r_2$, $r_3$, and $r_4$ are the four corners of the cell, with $r_1$ being the origin $(r_i)$, $r_2$ being found along the x-axis $(r_i+X)$, $r_3$ being found along the y-axis $(r_i+Y)$, and $r_4$ being the far corner. The partitioned kernels are:

$$FK_1 = \int_{V(r_i)} K^B(r', r_I, \chi_1, \chi_2) dr' \quad (14a)$$

$$FK_2 = \int_{V(r_i)} x K^B(r', r_I, \chi_1, \chi_2) dr' \quad (14b)$$

$$FK_3 = \int_{V(r_i)} y K^B(r', r_I, \chi_1, \chi_2) dr' \quad (14c)$$

$$FK_4 = \int_{V(r_i)} xy K^B(r', r_I, \chi_1, \chi_2) dr' \quad (14d)$$

Equations (13) and (14) are for two dimensions, but can be readily extended to three dimensions.

For the common angle image gathers, the combined broadband sensitivity kernel of equation (10) is replaced by $$K^B(r_i, r_I, p_{h_1}, p_{h_2}) = \frac{v(r_I)[K_D^B(r_i, r_I, p_{h_2}) + K_U^B(r_i, r_I, p_{h_2})]}{\sqrt{4\cos^2\theta_n - v^2(r_I) p_{h_2}^2}} - \frac{v(r_I)[K_D^B(r_i, r_I, p_{h_1}) + K_U^B(r_i, r_I, p_{h_1})]}{\sqrt{4\cos^2\theta_n - v^2(r_I) p_{h_1}^2}} \quad (15)$$

where the broadband kernel components are $$K_D^B(r, r_I, p_h) = \int \frac{W(\omega)}{\omega} \text{Im}\left[2k_0^2 \frac{\overline{G}_D(r; p_h, \omega)G(r; r_I, \omega)}{\overline{G}_D(r_I; p_h, \omega)}\right] d\omega \quad (16a)$$

$$K_U^B(r, r_I, p_h) = \int \frac{W(\omega)}{\omega} \text{Im}\left[2k_0^2 \frac{\overline{G}_U^*(r; p_h, \omega)G(r; r_I, \omega)}{\overline{G}_U^*(r_I; p_h, \omega)}\right] d\omega \quad (16b)$$

where $\overline{G}_D$ and $\overline{G}_U$ are plane wave components of the Green's functions for down- and up-going waves.

Accordingly, to determine the sensitivity kernels, the system begins by finding the Green's functions (or plane wave components of the Green's functions) for the various down-going waves, up-going waves, and scattering waves. Note that the Green's function can be viewed as the wave field that is produced in response to an impulse in time and space, making it possible to find these functions by applying wave propagation to an appropriately positioned impulse. The chosen wave propagation method can be any one of the existing wave propagation methods. For example, the operations represented by equations (2) and (3) above can be used. Alternatively, the system can employ any one of the various time migration approaches for anisotropic media outlined in PCT application PCT/US09/62911, "Seismic Imaging Systems and Methods Employing 3D Reverse Time Migration with Tilted Transverse Isotropy", filed Nov. 2, 2009 by Fan Jiang and Shengwen Jin.

Figure 9F:
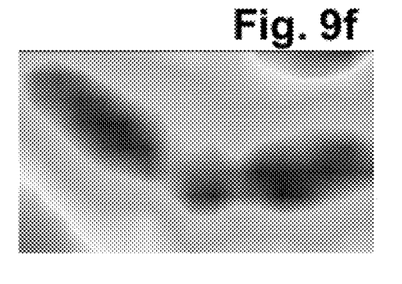
Figure 9G:
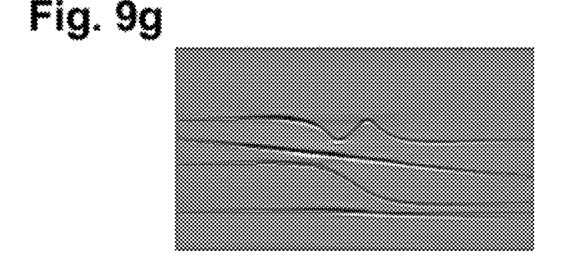

The Green's functions can then be used in various combinations according to equations 9-14 or equations 9 and 12-16 to obtain the partitioned broadband sensitivity kernels. These kernels, in combination with the depth residuals, define the system of equations given by equation (9) above. In block 718, the system assembles these values in preparation for solving. In block 720, the system applies a linear least squares solution method to obtain the normalized local velocity perturbations $m(r_i)$. The system of equations may be ill-conditioned, and if so, the inversion process can employ a classical regularization method to ensure first-order derivative smoothness or second-order derivative smoothness in both horizontal and vertical directions. FIG. 9f shows an illustrative set of velocity update values $\delta v(r)$ as a function of a vertical axis (depth) and a horizontal axis (inline- or x-axis) derived from the depth residuals in FIG. 9e.

Figure 8B:
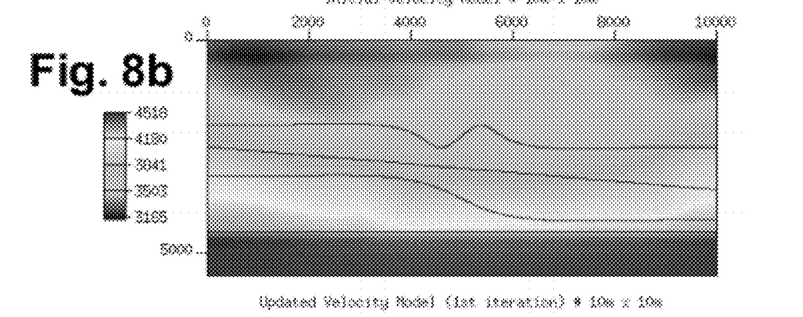

In block 722, the system applies the velocity updates to the velocity model. FIG. 8b shows an illustrative updated velocity model that results from adding the updates of FIG. 9f to the initial velocity model of FIG. 8a.

In block 724, the system determines whether the velocity model is satisfactory. One possible test is whether convergence has been achieved, i.e., whether the velocity updates are below some predetermined threshold. Another possible test is whether the residual moveout has been largely eliminated from the image gathers or whether the stacked image data appears reasonably clear and free of ghosting or smearing. If the velocity model is not satisfactory, the blocks 706-724 are repeated until the velocity model is deemed satisfactory. The system displays the final results to a user in block 726. FIG. 9f is an illustrative example of a final image once the velocity model has converged.

Figure 8C:
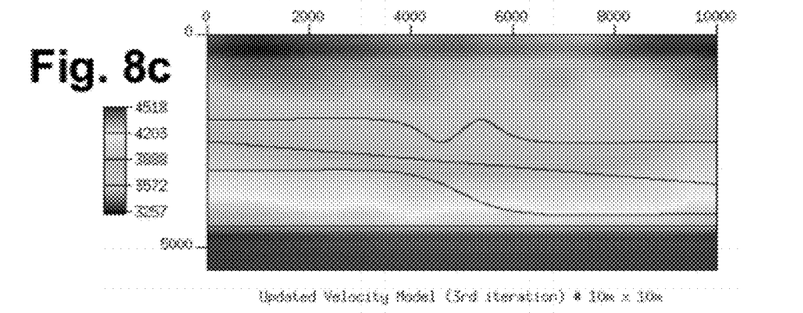

FIGS. 8a-8d show an illustrative progression of a velocity model from an initial velocity model in FIG. 8a, to the updated model after one iteration in FIG. 8b, to the velocity model after convergence has been achieved in FIG. 8c. The lines in FIGS. 8b and 8c are the true horizon lines, and are displayed for reference purposes. Note that the velocity models do not closely track the formation boundaries as would normally be expected. However, the horizon information extracted in block 710 can be used to convert the velocity model into a layered velocity model having consistent velocities throughout each formation layer as would be expected by most geophysicists.

Figure 8D:
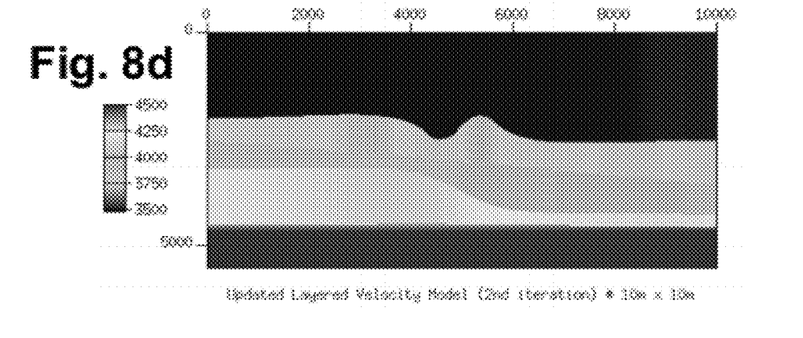

To convert an existing velocity model into a layered velocity model, the root mean square velocity is calculated for each point in the image volume for seismic energy propagating vertically from the surface. The horizons are used to define the layers of the layered velocity model. The velocity for the top layer is set to the root mean squared value extracted along the topmost horizon (H1). The velocity for the remaining layers is set to the difference between the root mean square velocities of the upper and lower horizons (e.g., H1 and H2 for layer 2). FIG. 8d shows the layered velocity model derived from FIG. 8c.

It is contemplated that the operations shown in FIG. 7 may be implemented in the form of software, which can be stored in computer memory, in long-term storage media, and in portable information storage media. It should be noted that illustrative method of FIG. 7 is provided as an explanatory aid. In practice, the various operations shown in FIG. 7 may be performed in different orders and need not even be sequential. Seismic data processing can benefit substantially from parallelism. In some processing method embodiments, data from different survey regions may be processed independently. In other embodiments, the operations may be "pipe-lined" or otherwise performed concurrently. Additional operations may be added to the illustrative method and/or several of the operations shown may be omitted.

Figure 10:
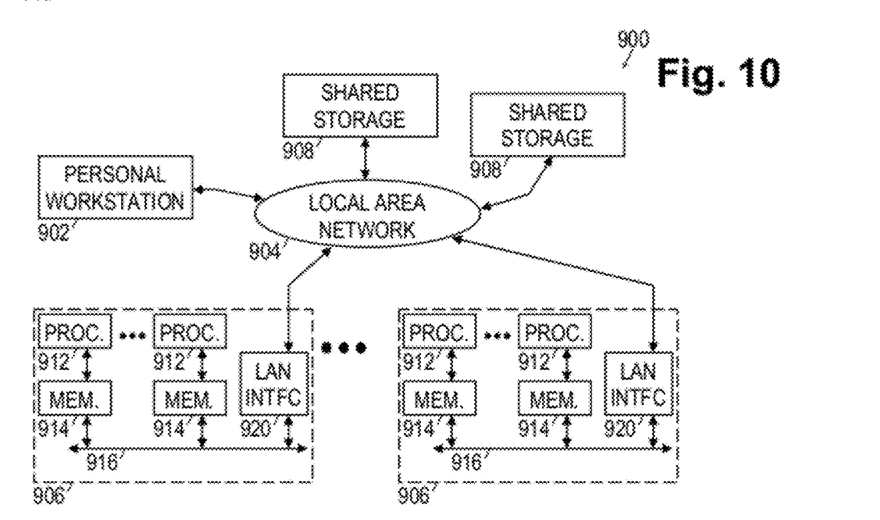
FIG. 10 shows an illustrative imaging system.

FIG. 10 shows an illustrative computer system 900 for performing seismic data processing including seismic imaging using tomographic migration-velocity analysis of common angle image gathers. A personal workstation 902 is coupled via a local area network (LAN) 904 to one or more multi-processor computers 906, which are in turn coupled via the LAN to one or more shared storage units 908. LAN 904 provides high-speed communication between multi-processor computers 906 and with personal workstation 902. The LAN 904 may take the form of an Ethernet network.

Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store a initial velocity data volume and shot gathers from a seismic survey. The (iteratively-updated) common angle image gathers can be temporarily stored on shared storage units 908 for later processing. In response to a request from the workstation 902, the image volume data can be retrieved by computers 906 and supplied to workstation for conversion to a graphical image to be displayed to a user.

Numerous variations and modifications will become apparent to those skilled in the art once the above disclosure is fully appreciated. It is intended that the following claims be interpreted to embrace all such variations and modifications.

What is claimed is:

1. A seismic imaging method that comprises:
   migrating seismic survey data with an anisotropic velocity model to obtain common angle image gathers;
   processing the common angle image gathers to obtain depth residuals along one or more horizons;
   determining subsurface opening angle sensitivity kernels for the horizons independent of shot location and based on the anisotropic velocity model and a Green's function at an image point;
   inverting the depth residuals using the determined sensitivity kernels to obtain velocity errors;
   applying updates to the velocity model based on the obtained velocity errors; and
   displaying a representation of the survey region to a user based at least in part on the updated velocity model.

2. The method of claim 1, further comprising re-migrating the seismic survey data using the updated velocity model.

3. The method of claim 2, further comprising repeating said processing, determining, inverting, applying, and re-migrating operations until a velocity model convergence is achieved.

4. The method of claim 1, wherein said processing comprises:
   stacking the common image gathers to identify said one or more horizons; and
   determining local dip angles based on the one or more horizons.

5. The method of claim 4, wherein said processing further comprises:
   measuring similarity between image gathers at different assumed velocity errors to obtain the depth residuals $\Delta z$.

6. The method of claim 5, wherein said measuring similarity comprises determining semblance of the gathers, and wherein the depth residuals correspond to the assumed velocity error that yields the highest semblance.

7. The method of claim 1, wherein said displaying includes determining a layered velocity model having constant velocity values between horizons.

8. A seismic imaging system that comprises:
   at least one storage device that stores traces from a seismic survey of a given survey region;
   a memory that stores seismic imaging software; and
   at least one processor coupled to the memory to execute the seismic imaging software, wherein the software causes the at least one processor to:
      migrate seismic survey data with an anisotropic velocity model to obtain image gathers;
      process the image gathers to obtain depth residuals along one or more horizons;
      determine subsurface opening angle sensitivity kernels for the horizons independent of shot location and based on the anisotropic velocity model and a Green's function at an image point;
      invert the depth residuals using the determined sensitivity kernels to obtain velocity errors;
      apply updates to the velocity model based on the obtained velocity errors; and
      display a representation of the survey region to a user based at least in part on the updated velocity model.

9. The system of claim 8, wherein the software further causes the at least one processor to re-migrate the seismic survey data using the updated velocity model.

10. The system of claim 9, wherein the software further causes the at least one processor to repeat said processing, determining, inverting, applying, and re-migrating operations until a velocity model convergence is achieved.

11. The system of claim 8, wherein as part of said processing operation, the software causes the at least one processor to:
    stack the image gathers to identify said one or more horizons; and
    determine local dip angles based on the one or more horizons.

12. The system of claim 11, wherein as part of said processing operation, the software further causes the at least one processor to:
    measure similarity between image gathers at different assumed velocity errors to obtain the depth residuals $\Delta z$.

13. The system of claim 12, wherein as part of said measuring, the software causes the processor to determine semblance of the image gathers, and wherein said depth residuals correspond to the assumed velocity error that yields the highest semblance.

14. The system of claim 8, wherein the software further causes the processor to determine a layered velocity model having constant velocity values between horizons.

15. The system of claim 8, wherein the velocity model is 3D.

16. A seismic imaging method that comprises:
    migrating seismic data with an anisotropic velocity model to obtain image gathers;
    processing the image gathers to obtain depth residuals along one or more horizons;
    determining subsurface opening angle sensitivity kernels for the horizons independent of shot location and based on the anisotropic velocity model and a Green's function at an image point;
    employing the determined sensitivity kernels to convert the depth residuals into velocity errors;
    applying updates to the velocity model based on the velocity errors; and
    displaying a representation of the survey region to a user based at least in part on the updated velocity model.

17. The method of claim 16, wherein the velocity model is 3D.

18. The method of claim 16, wherein said processing comprises:
    stacking the common image gathers to identify said one or more horizons; and
    determining local dip angles based on the one or more horizons.

19. The method of claim 18, wherein said processing further comprises:
    measuring similarity between image gathers at different assumed velocity errors to obtain the depth residuals $\Delta z$.

20. The method of claim 16, further comprising determining a layered velocity model having constant velocity values between horizons.

* * * * *